United States Patent
Andersson et al.

(10) Patent No.: US 6,594,499 B1
(45) Date of Patent: Jul. 15, 2003

(54) DOWNLINK POWER CONTROL IN A CELLULAR TELECOMMUNICATIONS NETWORK

(75) Inventors: Andreas Andersson, Kista (SE); Eddie Corbett, Stockholm (SE); Ralf-Dieter Kukla, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 332 days.

(21) Appl. No.: 09/668,302

(22) Filed: Sep. 25, 2000

(51) Int. Cl.$^7$ .............................. H04B 7/00; H04J 3/06; H04Q 7/20; G08B 23/00
(52) U.S. Cl. .......................... 455/522; 455/69; 455/70; 455/515; 455/436; 455/126; 455/127; 370/350; 370/337; 370/318; 370/345; 370/442; 340/316; 340/318; 340/534
(58) Field of Search ........................... 455/522, 69, 70, 455/54, 515, 436, 126, 127; 370/350, 337, 318, 345, 442, 336, 328, 329, 330; 340/316, 318, 539

(56) References Cited

U.S. PATENT DOCUMENTS

| | | | |
|---|---|---|---|
| 5,740,165 A | * | 4/1998 | Vannucci ..................... 370/330 |
| 6,072,792 A | * | 6/2000 | Mazur et al. ................ 370/345 |
| 6,166,622 A | * | 12/2000 | Hosur et al. ................. 340/318 |
| 6,275,478 B1 | * | 8/2001 | Tiedemann, Jr. ............ 370/318 |
| 6,334,047 B1 | * | 12/2001 | Andersson et al. ........... 455/69 |
| 6,466,772 B1 | * | 10/2002 | Rozenblit et al. ........... 455/126 |

FOREIGN PATENT DOCUMENTS

| | | |
|---|---|---|
| WO | WO 99/33207 | 7/1999 |
| WO | WO 99 52310 | 10/1999 |

OTHER PUBLICATIONS

European Telecommunications Standards Institute (ETSI), "Universal Mobile Telecommunications Systems (UMTS); Physical Layer Procedures (FDD), (3G TS 25,214 version 3.3.0 Release 1999)", Jun. 2000, pp. 1–45.

3G TS 25.214 V3.3.0 (Jun. 2000) Technical Specification 3$^{rd}$ Generation Partnership Project, "Physical Layer Procedures" (FDD).

3G TS 25.211 V3.1.0 (Dec. 1999) Technical Specification 3$^{rd}$ Generation Partnership Project, "Physical Channels and Mapping of Transport Channels Onto Physical Channels" (FDD).

* cited by examiner

*Primary Examiner*—Dwayne Bost
*Assistant Examiner*—Kamran Afshar
(74) *Attorney, Agent, or Firm*—Nixon & Vanderhye P.C.

(57) ABSTRACT

A power control system method for controlling the downlink (DL) transmit power from a base station (BS) to a mobile station (MS) in a cellular telecommunications network. A power balancing value $\Delta P$ is divided into a number of smaller correction implements which are distributed over a plurality of spaced apart slots for DL power control. For example, if it is desired to correct DL transmit power by six dB, a total of six different correction values of one dB each may be implemented with adjacent ones of the correction values being spaced apart by a number of slots. The distribution or spreading of DL transmit power corrections over a period of time results in a plurality of smaller corrections as opposed to one or a few large corrections, thereby reducing potential adverse effects on the inner loop power control of the network.

14 Claims, 4 Drawing Sheets

DOWNLINK POWER CONTROL IN A CELLULAR TELECOMMUNICATIONS NETWORK

FIELD OF THE INVENTION

The present invention relates generally to wireless radio telecommunication. More specifically, the invention relates to downlink (DL) power control from a base station (BS) to a mobile station (MS or UE) in a cellular telecommunications network.

BACKGROUND AND SUMMARY OF THE INVENTION

In a cellular communication system, a mobile radio station (MS) communicates over an assigned radio channel or link (RL) with a radio base station (BS). Several geographically-dispersed base stations are connected via digital transmission links to a switching node which is typically connected to a gateway that interfaces the cellular communications system with other communication systems. A call placed from an external network to a mobile station is directed to the gateway, and from the gateway through one or more switching nodes to a base station which serves the called mobile station. The base station pages the called mobile station, and assuming the mobile station responds to the page, establishes a radio communications channel. A call originated by the mobile station follows a similar path in the opposite direction (although there is no need for a page for a mobile-originated call).

In a code division multiple access (CDMA) mobile communications system, spreading codes are used to distinguish information associated with different mobile stations or base stations transmitting over the same radio frequency band. In other words, individual radio "channels" correspond to and are discriminated on the basis of these spreading codes. Spread spectrum (e.g., CDMA) communications permits mobile transmissions to be received at two or more (diverse) base stations and be processed simultaneously to generate one received signal. With these combined signal processing capabilities, it is possible to perform a handover from one base station to another, or from one antenna sector to another antenna sector connected to the same base station, without any perceptible disturbance in the voice or data communications. This kind of handover is typically called "diversity handover." Diversity handover may include "soft" and "softer" handover. During diversity handover, the signaling and voice information from plural sources is combined in a common point using decisions made on the "quality" of the received data. In soft handover, as a mobile station moves to the edge of a base station's cell, the adjacent cell's base station assigns a transceiver to the same call while a transceiver in the current base station continues to handle that call. As a result, the call is handed over on a "make-before-break basis." Soft diversity handover is therefore a process where two or more base stations handle a call simultaneously. "Softer" diversity handover occurs when the mobile station is in handover between two or more antenna sectors connected to the same multi-sector base station using a similar make-before-break methodology.

Because all users of a CDMA communications system transmit information using the same frequency band at the same time, each user's communication interferes with communications of other users. In addition, signals received by a base station from a mobile station close to that base station are much stronger than signals received from other mobile stations located at the base station's cell boundary. As a result, distant mobile communications may be overshadowed and dominated by close-in mobile stations which is why this condition is sometimes referred to as the "near-far effect."

The physical characteristics of a radio channel vary significantly for a number of reasons. For example, the signal propagation loss between a radio transmitter and receiver varies as a function of their respective locations, obstacles, weather, etc. As a result, large differences may arise in the strength of signals received at the base station from different mobiles. If the transmission power of a mobile station signal is too low, the receiving base station may not correctly decode a weak signal, and the signal will have to be corrected (if possible) or retransmitted. Accordingly, erroneous receipt of signals adds to the delay associated with radio access procedures, increases signal processing overhead, and reduces the available radio bandwidth because erroneously received signals must be retransmitted. On the other hand, if the mobile transmission power is too high, the signals transmitted by the mobile station create interference for the other mobile and base stations in the system. Ideally, all mobile-transmitted signals should arrive at the base station with about the same average power irrespective of their distance from the base station.

Interference is a particularly severe problem in CDMA systems because large numbers of radios transmit on the same frequency. If one radio transmits at a power output that is too large, the interference it creates degrades the signal-to-interference ratio (SIR) of other received signals, making it more difficult to correctly demodulate those signals. Accordingly, transmit power control (TPC) is important in a CDMA system. In uplink (UL) transmit power control, the mobile station attempts to control its transmit power to the base station based on the power control messages sent to the mobile station from the base station with the goal of controlling the power level of the signals received at the base station within a relatively small tolerance, e.g., 1 dB, for all mobile station transmissions received at that base station. In downlink (DL) power control, a focal point of this invention, the base station varies the power it is transmitting to a mobile station depending on transmit power control messages or TPC commands sent by the mobile station.

A problem with downlink power control is that the single transmit power control (TPC) command sent from the mobile station to all of the base stations involved in the diversity handover is not received identically. Because there are different paths between the mobile station and each of the base stations, and because different conditions affect each of those paths, the commands received at different base stations have different bit errors. As a result, the TPC command may be received correctly in one base station and incorrectly in another base station. The result is that the average transmit powers of the base stations involved in the diversity handover (which should either be the same or have a fixed offset) begin to drift away from the desired value(s). As this base station power drift increases, the full diversity gain is not realized. Diversity gain is ideally realized by receiving two or more radio links of equal power. If one link has a higher power than needed, the extra power is interference which decreases the overall capacity of the communications system. If one link has a lower power than it should, there is a loss of diversity gain.

To combat base station power drift, the power transmission level of each base station in a diversity handover may be compared to a power reference ($P_{ref}$) established for all base stations in the diversity handover. The power reference may be set individually per connection (e.g., UTRAN-UE connection) or per radio link in certain embodiments. The difference between measured transmit power ($P_{init}$) of each base station and the reference power $P_{ref}$ may then be used to correct or balance the transmit power level of that base station. The reference power level(s) used in compensating for base station power drift is(are) advantageously determined using one or more parameters relevant to the current condition of the diversity handover communication. Rather than setting an arbitrary and static reference power level, the reference power level may be set dynamically so that it is relevant to the current conditions of the diversity handover communication. Dynamic and adaptive reference power level setting results in more effective and more efficient downlink power control. Exemplary reference power values $P_{ref}$ and exemplary methods of obtaining the same are discussed in commonly owned U.S. Ser. No. 09/531,650, filed May 31, 2000, the disclosure of which is hereby incorporated herein by reference. For example, an average transmit power may be determined for first and second base stations, and the reference power level $P_{ref}$ set to a mean of the average power levels of the first and second base stations. In another example, the average transmit power of a dominant or favored base station may be calculated and used as the reference power $P_{ref}$.

3G TS 25.214 (V3.3.0) (2000-06), the disclosure of which is hereby incorporated herein by reference, describes a system and method for DL power control. In general, a MS (or UE) generates TPC commands to control the network transmit power. These TPC commands are sent by the MS to base station(s) in the TPC field of the uplink DPCCH (Dedicated Physical Control Channel). Upon receiving the TPC commands, the UMTS terrestrial radio access network (UTRAN) adjusts its downlink (DL) power accordingly. As described in TS 25.214, Section 5.2.1.2.2, after estimating the $k^{th}$ TPC command, the UTRAN adjusts the current downlink power P(k−1) [dB] to a new power P(k) [dB] according to following equation:

$$P(k)=P(k-1)+P_{TPC}(k)+P_{bal}(k) \quad (1)$$

where $P_{TPC}(k)$ is the $k^{th}$ power adjustment due to the inner loop power control, and $P_{bal}(k)$ is a power balancing correction according to a DL power control procedure for balancing radio link (RL) powers toward a common reference power. The instant invention relates to how to determine and/or implement $P_{bal}(k)$.

Annex B.3 of 3G TS 25.214 discusses an algorithm for calculating $P_{bal}(k)$. Unfortunately, this algorithm is somewhat exponential in nature in that it causes large valued corrections $P_{bal}(k)$ to be made early on in the DL power control process which are followed by smaller changes in DL power control. It is believed that initial large power control changes on the DL may be detrimental and adversely affect the inner loop power control.

Accordingly, it will be apparent that there exists a need in the art for a system and corresponding method for DL power control balancing which can be carried out in a more distributed manner. In other words, there exists a need for a DL power control balancing correction(s) that can be implemented through a number of smaller balancing correction or adjustment steps spread out over a plurality of spaced apart slots on the DL.

Consequently, the present invention includes a power control system and/or method for controlling the downlink (DL) transmit power from a base station (BS) to a mobile station (MS) in a cellular telecommunications network. A power balancing value ΔP may be divided into a number of smaller correction implements which are distributed over a plurality of spaced apart slots for DL power control. For example, if it is desired to correct DL transmit power by six dB for balancing purposes, a total of six different correction values of one dB each may be implemented with adjacent ones of the correction values being spaced apart by a number of slots. For example, one of the single dB corrections may be implemented to control DL transmit power every ten slots so that the six corrections of one dB each are spread out over a total of sixty slots. The distribution or spreading of DL transmit power corrections over a larger period of time results in a plurality of smaller corrections as opposed to one or a few large corrections, thereby reducing potential adverse effects on inner loop power control of the network.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be applied advantageously to DL power control for more than two base stations; however, for simplicity, diversity handover scenarios are described with just two base stations. In other instances, detailed descriptions of well known methods, interfaces, devices and signaling techniques are omitted so as not to obscure the description of the present invention with unnecessary detail.

Generally speaking, certain embodiments of this invention relate to distributing or spreading a downlink (DL) power balancing adjustments over a plurality of spaced apart DL transmit slots from a base station(s) to a mobile station (MS) in order to end up with a plurality of smaller spaced apart transmit power adjustments as opposed to one or a few large balancing adjustment(s). This enables a reduction of potentially adverse effects on the inner loop power control of the network, and also provides for an efficient DL power control system/method.

Prior to a detailed discussion regarding the particulars of exemplary embodiments of this invention, it is felt that a general discussion of an overall network in which the invention may be implemented is appropriate.

Figure 1:
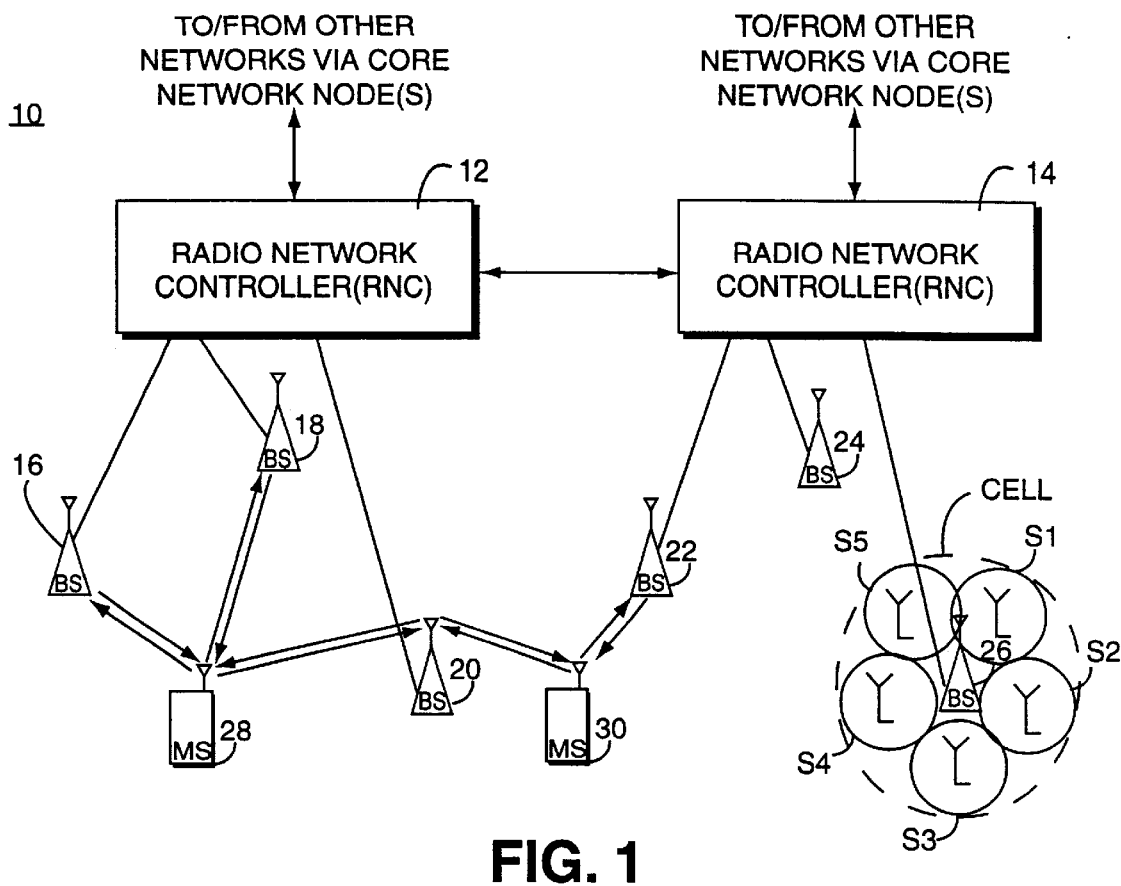
FIG. 1 is a high level diagram of an example communication system in which the present invention may be employed.

A mobile radio cellular telecommunications system 10 is shown in FIG. 1 and may be, for example, a CDMA or a wideband CDMA communications system. Radio network controllers (RNCs) 12 and 14 control various radio network functions including for example radio access bearer setup, diversity handover, etc. More generally, each RNC directs mobile station calls via the appropriate base station(s). Radio network controller 12 is coupled to a plurality of base stations 16, 18, and 20. Radio network controller 14 is coupled to base stations 22, 24, and 26. Each base station (BS) serves a geographical area that can be divided into one or more cell(s). Base station 26 is shown as having five antenna sectors S1–S5, which can be said to make up the cell of the BS 26. The base stations are coupled to their corresponding radio network controller (RNC) by a digital link established via dedicated telephone lines, optical fiber links, microwave links, etc. Both radio network controllers (RNCs) 12 and 14 are connected with external networks such as the Public Switched Telephone Network (PSTN), the Internet, etc. through one or more core network nodes like a mobile switching center (not shown) and/or a packet radio service node (not shown).

In FIG. 1, two mobile stations 28 and 30 are shown communicating with plural base stations in diversity handover situations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between a mobile station and a base station has an uplink (UL) component and a downlink (DL) component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 2:
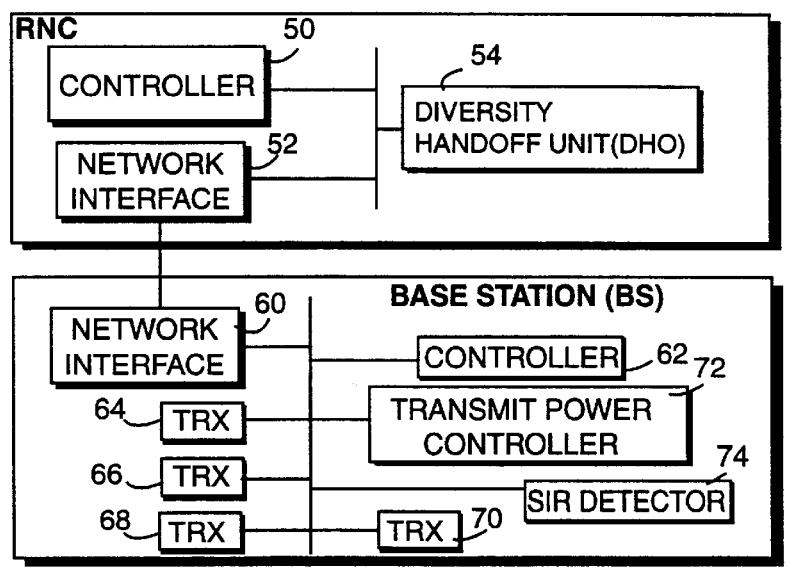
FIG. 2 is a function block diagram of radio network controller and a base station illustrated in FIG. 1.

Some additional details of a base station (BS) and a radio network controller (RNC) are now provided in conjunction with FIG. 2. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs functions required for establishing, maintaining, and dropping diversity connections such as diversity combining, diversity splitting, power control and other link related radio resource control algorithms. The RNC may include other control/functional units not necessary to the understanding of the invention.

Each base station (BS) includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio links. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell(s) monitor the common channel. Transmit power controller 72 performs power control operations based on messages received from the RNC and from mobile stations. One or more signal-to-interference ratio (SIR) detectors 74 (only one is shown for purposes of illustration) may be used to detect the SIR of signals received from mobile stations. Other signal quality detectors may be employed, e.g., CIR, RSSI, etc. Transmit power controller 72 in each BS executes the code and/or algorithms set forth below in Examples 1–2 in order to control transmit power balancing in accordance with different embodiments of this invention.

Figure 3:
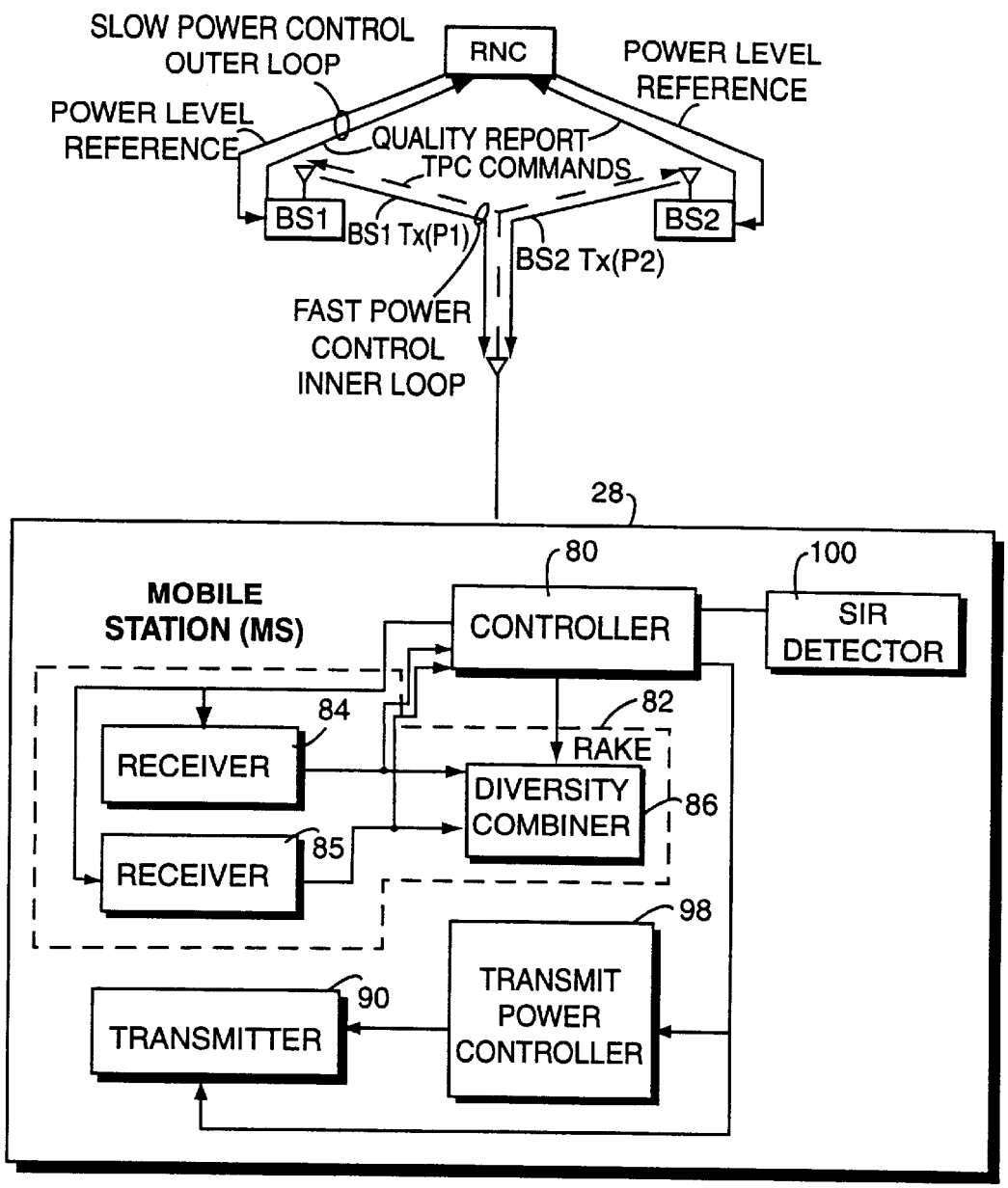
FIG. 3 is a function block diagram illustrating a mobile station shown in FIG. 1, as well as fast (i.e., inner) and slow (i.e., outer) power control loops in an example power control scheme in a mobile communications system.

FIG. 3 illustrates additional details of a mobile station (MS) 28, 30 shown in FIG. 1. The mobile station includes a controller 80 connected to a RAKE receiver 82, a transmit power controller 98, a transmitter 90, and a SIR (or other signal quality) detector 100. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combined in diversity combiner 86, and processed as one signal. Transmit power controller 98 determines the transmit power level (e.g., as a signal-to-interference ratio (SIR)) of the received, diversity-combined signal.

FIG. 3 also shows two power control loops: a fast power control inner loop between the mobile station and two base stations BS1 and BS2 and a slow power control outer loop between the two base stations and the RNC. Based upon SIR measurements of a received signal, the mobile station (MS) generates a transmit power control (TPC) command and sends it to the base stations BS1 and BS2 in the form of TPC bits shown in a particular slot of an exemplary frame in FIG. 4. Similarly, the base stations BS1 and BS2 send DL transmit power control commands to the mobile station based on SIR measurements made of signals received from that mobile station. The TPC commands may include one or more bits which indicate a desired increase in transmit power, a desired decrease in transmit power, or in some cases, no change in transmit power. Of course, any number of bits or bit assignments is possible. In order to compensate for rapidly changing transmission conditions, these transmit power control commands are sent very frequently, and in one example embodiment, every 0.667 millisecond time slot or 1,500 times a second. Accordingly, this type of power control is referred to as fast, inner loop control. In the slower, outer control loop, the RNC may monitor signal quality reports provided from the base stations. Example quality measures from the base stations used in outer loop power control include Block Error Rate, Bit Error Rate, SIR, etc.

When the RNC desires to calculate base station reference power(s), the RNC requests the base stations to report their actual transmit power levels. A reference power level $P_{ref}$ is then determined by the RNC based on one or more of the determined transmit power levels. That reference power level $P_{ref}$ is used to regulate an adjustment of the respective power levels of the base stations for the diversity handover communication. More specifically, the transmit power controller 72 in each base station regularly forwards to the radio network controller 50 periodic measurement reports including: (1) a current radio link transmit power level (from the base station to the mobile station) associated with the diversity handover communication and (2) a signal quality indicator (received from the mobile station) associated with transmitted signals from that base station to the mobile station in the diversity handover communication. For purposes of this description, it will be understood that base station transmit power level refers to the power level on the radio link from the base station to the mobile station.

A reference power level $P_{ref}$ received from the radio network controller (RNC) is used by the base station's transmit power controller 72 to adjust current transmit power of the transceiving circuitry associated with the diversity handover communication. In particular, a difference $\Delta P$ is calculated between the reference power $P_{ref}$ and the current transmit power level $P_{init}$, and that difference is used to calculate a total power balancing correction value(s) as described below. The current transmit power level of the base station for the diversity handover radio link is adjusted by the transmit power controller 72 using the correction value(s) as set forth in FIGS. 5–6.

Particular embodiments of the instant invention will now be described in more detail. Generally speaking, a DL power control procedure controls power of a DPCCH and its corresponding DPDCHs (dedicated physical data channels). The power control loop adjusts the power of the DPCCH and the DPDCHs approximately the same amount, so that the relative power difference between the two is not changed as they are transmitted from a BS to a MS.

Figure 4:
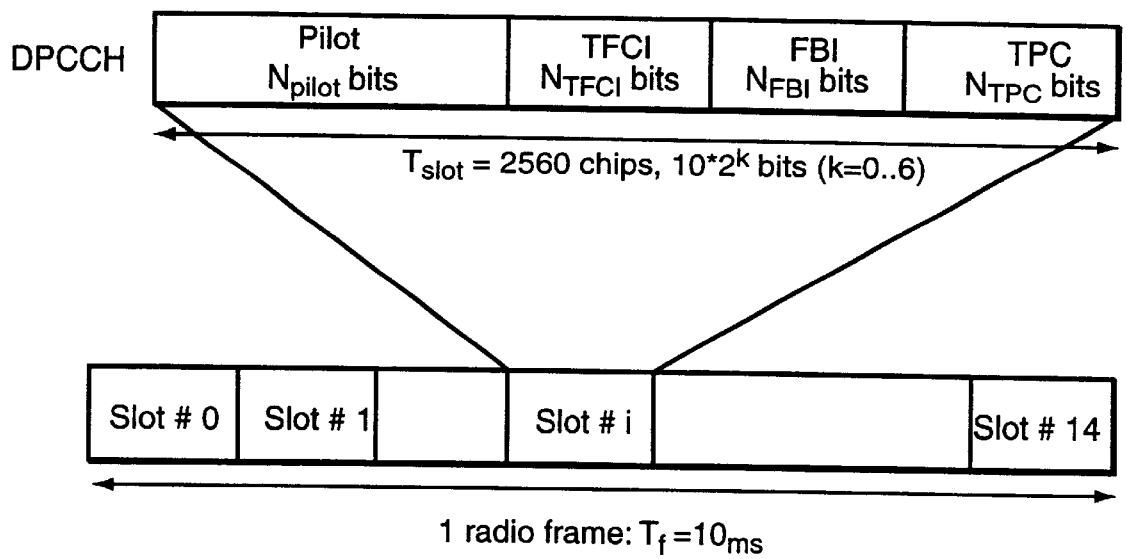
FIG. 4 is a schematic diagram illustrating an UL frame including TPC control bits that is transmitted from a MS to a BS in the network of FIGS. 1–3.

Referring to FIG. 4, a MS 28, 30 forwards radio frames on the UL to one or more base stations 16, 18, 20, 22, 24. For purposes of example, one frame including fifteen (15) different slots is shown in FIG. 4. Each slot is about 10 ms in length. As can be seen in FIG. 4, the MS generates TPC commands that are sent on the UL to one or more BSs to control network transmit power. The TPC commands are sent in the TPC field of the UL DPCCH in certain embodiments. Further details are discussed in TS 25.214, incorporated herein by reference.

Upon receiving TPC commands, the UTRAN (e.g., BSs, RNCs, etc.) adjusts DL transmit power accordingly. As discussed above and in TS 25.214, Section 5.2.1.2.2, after estimating the $k^{th}$ TPC command, the UTRAN adjusts the current downlink power $P(k-1)$ [dB] to a new power $P(k)$ [dB] according to following equation:

$$P(k)=P(k-1)+P_{TPC}(k)+P_{bal}(k) \qquad (1)$$

where $P_{TPC}(k)$ is the $k^{th}$ power adjustment due to the inner loop power control, and $P_{bal}(k)$ is a balancing correction value according to a DL power control procedure for balancing radio link (RL) powers toward a common reference power. Calculation of $P_{TPC}(k)$ is described in TS 25.214, incorporated herein by reference. Meanwhile, calculation and implementation of power balancing correction value(s) $P_{bal}(k)$ is the primary focus of this invention.

According to certain embodiments of this invention, instead of making a DL power balancing adjustment $P_{bal}(k)$ every slot as in TS 25.214, the power balancing is implemented by way of a plurality of power balancing corrections that are spaced apart from one another by a number of slots. In such a manner, large power balancing adjustments can be avoided so as to reduce the potential for adverse effects on the inner control loop.

Figure 5:
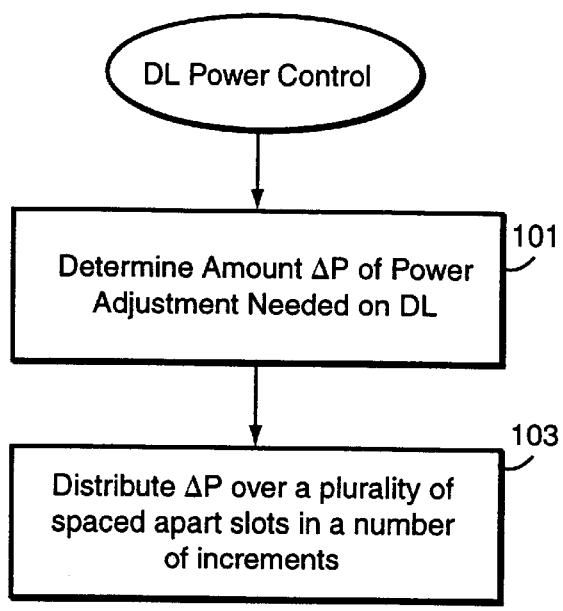
FIG. 5 is a flow chart illustrating general aspects of an embodiment of this invention.

FIG. 5 is a flowchart illustrating certain steps taken in accordance with an embodiment of this invention. Initially, the total amount of power adjustment balancing (e.g., approximately $\Delta P$ in certain embodiments) needed/desired is determined (step 101). This may be determined, for example, by calculating the difference $\Delta P$ between a DL transmit power reference value and a current DL transmit power, i.e., $\Delta P=P_{ref}-P_{init}$. Thereafter, at least a portion of the total amount of balancing adjustment $\Delta P$ is implemented in a plurality of spaced apart adjustments $\Delta_{bal}$ (step 103). For example, if it is desired to perform a total balancing adjustment $\Delta P$ of 4 dB, four separate 1 dB (i.e., $\Delta_{bal}=1$ dB) adjustments may be implemented over the course of several radio frames in order to achieve the 4 dB total balancing adjustment.

Different equations/algorithms may be utilized in accordance with different embodiments of this invention to implement the concept of spreading DL transmit power balancing adjustments over a plurality of spaced apart slots during an adjustment period. According to one exemplary embodiment of this invention, the spacing in slots between DL power balancing corrections/adjustments may be determined by the following equation:

$$T_{bal}=\max\{1, (\Delta_{bal} \cdot AP \cdot 15)/((1-r) \cdot |P_{ref}-P_{init}|)\} \qquad (2)$$

wherein $\Delta_{bal}$ is the step size in dB of the DL power adjustment(s), AP stands for "Adjustment Period" which is the time period in frames during which the total DL power balancing adjustment $\Delta P$ is to take place (note: the "Adjustment Period" or "AP" is multiplied by fifteen (15) in order to transform it from "frame" units into "slot" units, i.e., there are 15 slots per radio frame as shown in FIG. 4), "r" is the adjustment ratio which may be from 0 to 1 in different embodiments, $P_{ref}$ is the reference power level (e.g., see U.S. Ser. No. 09/531,650, filed May 31, 2000, for exemplary calculations of the reference power level), and $P_{init}$ is the determined DL transmit power from the BS to a MS on the RL at issue at the beginning of the Adjustment Period. Thus, $P_{ref}-P_{init}$ represents a total power balancing value $\Delta P$ in this particular embodiment.

From equation (2), the resulting value $T_{bal}$ is in slot units. For example, if $T_{bal}$ were calculated to be eight (8) slots, then a DL balancing adjustment of $\Delta_{bal}$ dB would be utilized as $P_{bal}(k)$ in equation (1) every eighth ($8^{th}$) slot in the Adjustment Period until the desired total DL power balancing $\Delta P$ had been achieved. In the remaining slots (i.e., those slots between every $8^{th}$ slot), $P_{bal}(k)$ in equation (1) would be zero (0). Alternatively, $T_{bal}$ could be any other suitable number of slots in different embodiments of this invention (e.g., $T_{bal}$ could be from about 0–50 slots in different embodiments).

EXAMPLE 1

Given equations (1) and (2), consider the following example. Let us assume for purposes of example only that: $\Delta_{bal}=1$ dB; "Adjustment Period"=3 frames; "r"=0.05; and $P_{ref}-P_{init}=7$ dB. When these exemplary values are plugged into equation (2), the resulting DL power balancing adjustment slot spacing value $T_{bal}$ is about 6.77. When $T_{bal}$ is rounded downwardly to the nearest integer, then $T_{bal}$ is 6 slots. Thus, a DL power balancing adjustment of $\Delta_{bal}$ will be implemented every $6^{th}$ slot until an appropriate balancing (e.g., a total correction of about 7 dB in this example given $P_{ref}-P_{init}=7$ dB) has been achieved. In this example, this will take seven (7) separate adjustments $\Delta_{bal}$. Thus, the DL transmit power from the relevant BS(s) to the relevant MS(s)

will be as follows as shown in Chart 1 in the three frames making up the Adjustment Period (AP):

CHART 1 (Part of Example 1)

| Slot (Frame) | $P_{bal}(k)$ in Equation (1) (i.e., $\Delta_{bal}$) |
|---|---|
| 0(1) | 1 dB (Balancing Adjustment #1) |
| 1(1) | 0 dB |
| 2(1) | 0 dB |
| 3(1) | 0 dB |
| 4(1) | 0 dB |
| 5(1) | 0 dB |
| 6(1) | 1 dB (Balancing Adjustment #2) |
| 7(1) | 0 dB |
| 8(1) | 0 dB |
| 9(1) | 0 dB |
| 10(1) | 0 dB |
| 11(1) | 0 dB |
| 12(1) | 1 dB (Balancing Adjustment #3) |
| 13(1) | 0 dB |
| 14(1) | 0 dB |
| 0(2) | 0 dB |
| 1(2) | 0 dB |
| 2(2) | 0 dB |
| 3(2) | 1 dB (Balancing Adjustment #4) |
| 4(2) | 0 dB |
| 5(2) | 0 dB |
| 6(2) | 0 dB |
| 7(2) | 0 dB |
| 8(2) | 0 dB |
| 9(2) | 1 dB (Balancing Adjustment #5) |
| 10(2) | 0 dB |
| 11(2) | 0 dB |
| 12(2) | 0 dB |
| 13(2) | 0 dB |
| 14(2) | 0 dB |
| 0(3) | 1 dB (Balancing Adjustment #6) |
| 1(3) | 0 dB |
| 2(3) | 0 dB |
| 3(3) | 0 dB |
| 4(3) | 0 dB |
| 5(3) | 0 dB |
| 6(3) | 1 dB (Balancing Adjustment #7) |
| 7(3) | 0 dB |
| 8(3) | 0 dB |
| 9(3) | 0 dB |
| 10(3) | 0 dB |
| 11(3) | 0 dB |
| 12(3) | 0 dB |
| 13(3) | 0 dB |
| 14(3) | 0 dB |

As can be seen in Chart 1, because $T_{bal}$ was calculated to be 6 slots in Equation (2), the seven (7) power balancing adjustment steps of $\Delta_{bal}=1$ dB were only implemented as $P_{bal}(k)$ in Equation (1) every $6^{th}$ slot during the Adjustment Period (AP) until a total balancing adjustment of 7 dB had been achieved. In other words, for every $6^{th}$ slot during the Adjustment Period (AP) up until the 7 dB balancing adjustment was achieved, Equation (1) was as follows: $P(k)=P(k-1)+P_{TPC}(k)+1$ dB. However, in all other slots during the AP, power adjustment was made via Equation (1) but $\Delta_{bal}$ (or $P_{bal}(k)$) was 0, i.e., in the other slots in $P(k)=P(k-1)+P_{TPC}(k)+0$, so that the only DL transmit power adjustment was via $P_{TPC}$ (i.e., via the inner loop power control) in the other slots.

In accordance with TS 25.433, a base station (BS) upon reception of a DL POWER CONTROL REQUEST from an RNC begins to balance DL powers so that at the end of the "Adjustment Period" (AP) the accumulated power change $\Sigma P_{bal}$ due to power balancing during that adjustment period (AP) is within $+/-0.5$ dB of $(1-r)\cdot(P_{ref}-P_{init})$. Those of skill in the art will recognize that the power balancing systems and methods described herein represent efficient ways of complying with TS 25.433.

EXAMPLE 2

Pseudo code for implementing Equation (2) is set forth below in this particular example.

Exemplary Pseudo Code

```
at reception of DL Power Control Request
    if Power Adjustment Type=None
        suspend ongoing DL Power Offset Setting
    else if Power Adjustment Type=Common
        C=1-r
        IncrStep (Δ_bal)=1 dB
        at the start of every Adjustment Period (AP)
            sample DL Power of each involved RL to get P_init
            ΔP=C·(P_ref-P_init)
            NmbrAdjust=min[round(|ΔP|)/IncrStep, floor
                {(15·AP)/MaxAdjStep}
            if NmbrAdjust ≠0
                T_bal=AP·15/ceil(NmbrAdjust, 2^n)
                if T_bal<MaxAdjStep
                    T_bal=MaxAdjStep
                end
            end
            m=NmbrAdjust
            while m>=1
                every T_bal^th slot, P(k)=P(k-1)+P_TPC(k)+
                    IncrStepe·(sign)ΔP
                m=m-1
            end
        end
```

Figure 6:
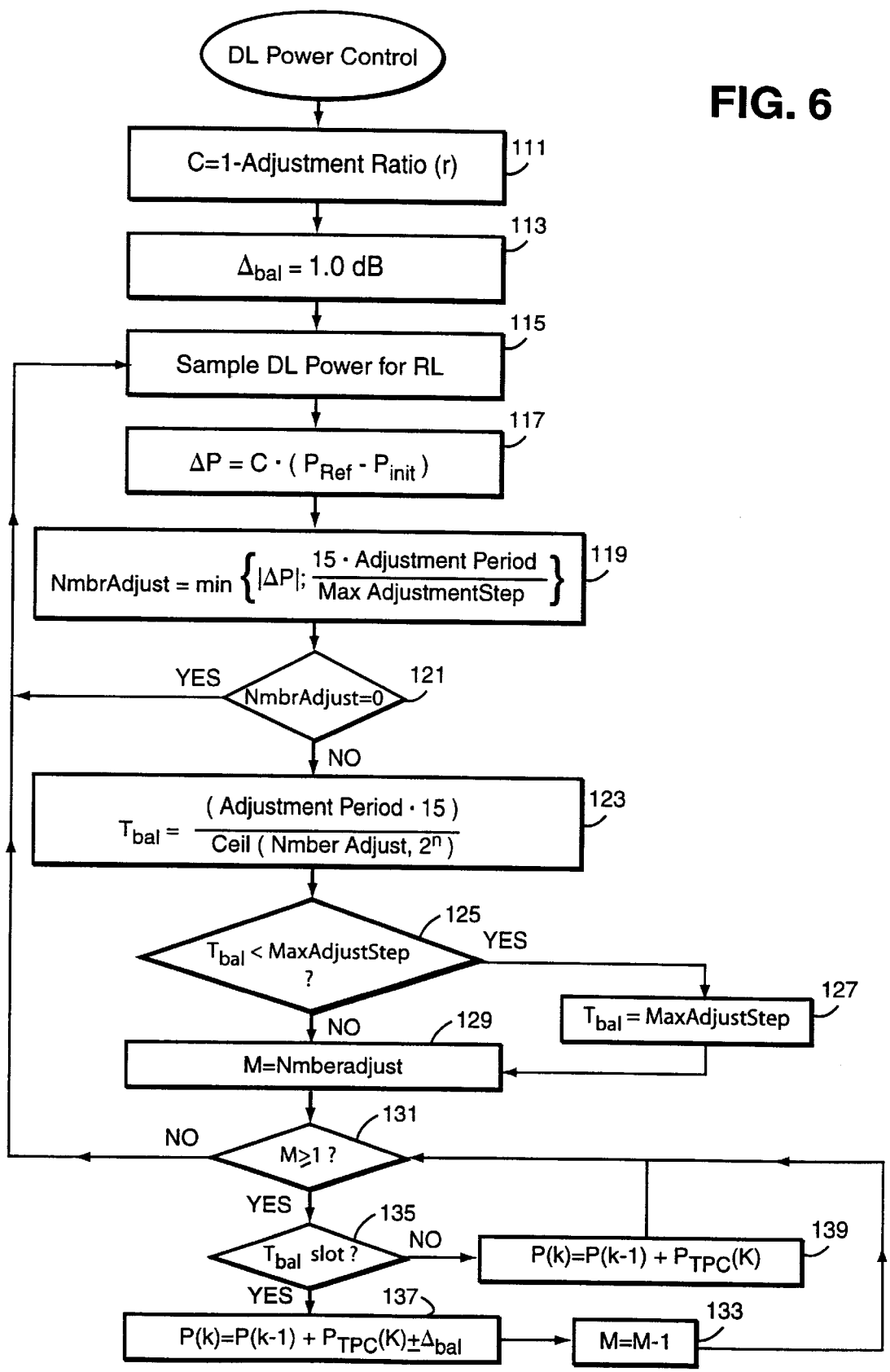
FIG. 6 is a flow chart illustrating a plurality of steps taken in carrying out an embodiment of this invention in the context of the network of FIGS. 1–4.

FIG. 6 is a flowchart illustrating steps taken in the implementation of the aforesaid pseudo code for this Example 2. Preferably the steps set forth in the flowchart and in the code above are carried out by a BS in the network of FIGS. 1–3, except that the BS may receive certain parameters (e.g., r, $P_{ref}$, $\Delta_{bal}$, etc.) from the RNC. Initially, C is set to $1-r$ where "r" is the adjustment ratio (step 111). The value for "r" may be from 0–1 in different embodiments of this invention, although it is preferably from about 0–0.1. The value for adjustment step parameter IncrStep (same as $\Delta_{bal}$) is then set (step 113). In this Example, IncrStep is set to 1.0 dB. However, IncrStep (and thus $\Delta_{bal}$) may be set to other values (e.g., 2.0 dB, etc.) in other embodiments of this invention. The current DL transmit power is then sampled to obtain a value for $P_{init}$ (step 115), via slot value. It is noted that $P_{ref}$ is preferably provided to the BS from an appropriate RNC. The desired total power balancing adjustment value $\Delta P$ is then determined (step 117). The power balancing value for $\Delta P$ may be determined by any suitable technique. For example and without limitation, $\Delta P$ may be determined as shown in FIG. 6 and in the aforesaid pseudo code by multiplying "C" by $(P_{ref}-P_{init})$. Alternatively, $\Delta P$ may be determined simply by $P_{ref}-P_{init}$.

Once the total amount of power balancing adjustment $\Delta P$ desired has been determined, the number of adjustment steps (NmbrAdjust) is determined (step 119). This is determined to be the smallest (or minimum) of (a) the absolute value of $\Delta P$ divided by IncrStep, and (b) 15 multiplied by the Adjustment Period (AP) divided by the maximum permissible adjustment step (MaxAdjStep), rounded to the nearest lower integer. Regarding (b), "floor"(x) in the aforesaid code means that (x) is rounded to the nearest lower integer. Thus, if for example (a) is 7 because $\Delta P$ is 7 dB and IncrStep is 1 dB, and (b) is 5, then five (5) is selected in step 119 as the total number of adjustment steps to be performed (NmbrAdjust). In step 121 it is determined whether NmbrAdjust has been found to equal zero. If so, then the flow returns to step 115. If not, then the flow proceeds as illustrated.

The slot spacing value $T_{bal}$ is then calculated (step 123). Different methods can be utilized in calculating $T_{bal}$ in different embodiments of this invention. In this Example, $T_{bal}$ is initially calculated to be the AP multiplied by 15 (because AP is in "frame" units and there are 15 slots per frame) divided by ceil(NmbrAdjust, $2^n$). $T_{bal}$ is rounded to the nearest lower integer in step 123. The phrase ceil (NmbrAdjust, $2^n$) means that NmbrAdjust is rounded upwardly to the nearest integer that can be expressed as $2^n$ where "n" is an integer. For example, if NmbrAdjust were 3, then ceil(NmbrAdjust, $2^n$) would round it upwardly to 4 in step 123. If NmbrAdjust were 6, then ceil(NmbrAdjust, $2^n$) would round it upwardly to 8. If NmbrAdjust were 13, then ceil(NmbrAdjust, $2^n$) would round it upwardly to 16. If NmbrAdjust were 32, then ceil(NmbrAdjust, $2^n$) would not round it upwardly at all and would maintain the value at 32. The ceil(NmbrAdjust, $2^n$) function that is the denominator in step 123 is performed in order to replace a division with a possibly large ratio (which can be tricky in FPGA) by a shift operator.

It is then determined in step 125 whether or not $T_{bal}$ is less than MaxAdjustStep. MaxAdjustStep represents the time in slots over which one cannot adjust by more than 1.0 dB in power balancing. Thus, if MaxAdjustStep was 4, then this means that not more than 1.0 dB of power balancing adjustment is permissible per a 4 slot period (MaxAdjustStep does not include the DL inner loop PC adjustment, but only relates to DL power balancing). This may be a requirement of TS 25.433 (incorporated herein by reference) in order to limit the limit the slope of change in power. Thus, step 125 is performed in order to ensure that the systems herein comply with potential requirements of TS 25.433 in this regard. If the answer to the inquiry in step 125 is yes, then $T_{bal}$ is adjusted upwardly so that it is equal to MaxAdjustStep (step 127). If $T_{bal}$ is determined in step 125 to be at least as great as MaxAdjustStep (in units of slots), then the flow proceeds to set "m" equal to NmbrAdjust (step 129). Step 129 is performed in conjunction with steps 131 and 133 in order to ensure that power balancing adjustments stop after the requisite number (NmbrAdjust) of them have been performed, e.g., in order to achieve a total adjustment of ΔP.

When "m" is 1 or greater in step 131, then the flow proceeds to perform a DL power balancing adjustment of $\Delta_{bal}$ dB (plus or minus as required). In step 135 it is determined whether the current DL slot at issue has been designated as a balancing adjustment slot by $T_{bal}$ (e.g., whether the current slot is one of slot 0 (frame 1), slot 6 (frame 1), slot 12 (frame 1), slot 3 (frame 2), slot 9 (frame 2), slot 0 (frame 3), or slot 6 (frame 3) above in Chart 1). If yes, then step 137 is performed and the DL power is adjusted for the BS in that slot for balancing purposes by an amount equal to the value for which $\Delta_{bal}$ is set with the appropriate sign (+/−). In certain embodiments, the first power balancing adjustment step may be taken in the same slot where the DL power $P_{init}$ is sampled. If not in step 135, then no balancing adjustment is performed in that particular slot and step 139 is performed.

For purposes of further example in this Example 2, consider the situation where MaxAdjustStep=5 slots; AP=10 frames; r=0; $\Delta_{bal}$=1 dB; and ($P_{ref}$−$P_{init}$)=6 dB. It is noted that values MaxAdjustStep, AP, r, $\Delta_{bal}$, and $P_{ref}$ are preferably provided to the BS from an RNC with which the BS is in communication, while the BS itself preferably determines value(s) for $P_{init}$. Given these parameters plugged into the code illustrated above in this Example 2 and in FIG. 6, the result is $T_{bal}$=18 slots, so that a DL balancing power adjustment of 1 dB is implemented every $18^{th}$ slot during the AP until the total adjustment of 6 dB has been achieved (i.e., for a total of six adjustment slots during the AP since $\Delta_{bal}$=1 dB). In a situation where the calculations conclude that no power adjustments are necessary, then none need be performed. This concludes Example 2.

In addition, the Power Adjustment Type (PAT) can also be set to "individual" according to 3G TS25.433. In such a case, the same steps as outlined above where PAT=common are carried out except that different radio links have potentially different reference powers.

In an alternative embodiment of this invention, the aforesaid algorithm (2) and code can be adjusted in order to attempt to further spread the balancing adjustments throughout the AP. This can be done by checking if an increase in $T_{bal}$ by one slot would be accepted. For example, the following equation could be used for such a check:

$$\text{Is } 15 \cdot AP \geq (T_{bal}+1) \cdot |\text{NmbrAdjust}|? \tag{4}$$

If so, then the balancing adjustments may be further spread by utilizing an additional slot between each balancing adjustment in the AP. The check in equation (4) is done to ensure that the adjustments to be performed will not span a larger time period than the AP.

While the present invention has been described with respect to a particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. A method of adjusting transmit power from a base station to a mobile station, said method comprising the steps of:

determining a transmit power level of the base station;

determining a reference power level;

determining a desired power balancing value based at least upon the determined transmit power level and the determined reference power level; and adjusting the transmit power of the base station by spreading at least a portion of the power balancing value over a plurality of spaced apart transmit power balancing adjustments in an adjustment period so that at least first and second power balancing adjustments are applied to the transmit power of the base station in first and second spaced apart slots in the adjustment period, respectively, with no power balancing adjustments being applied to the transmit power of the base station in slots between the first and second spaced apart slots.

2. The method of claim 1, further comprising:

each of a plurality of base stations calculating a corresponding difference between the reference power level and a current transmit power level;

each of the plurality of base stations calculating a corresponding power balancing value using at least the corresponding difference; and each of the plurality of base stations adjusting its transmit power level by spreading at least a portion of the corresponding power balancing value over a plurality of spaced apart transmit power balancing adjustments in an adjustment period.

3. The method of claim 1, further comprising determining a number of adjustments to be made in order to implement the at least a portion of the power balancing value.

4. The method of claim 3, further comprising rounding the number of adjustments to the nearest integer which can be expressed as $2^n$, wherein n is an integer.

5. The method of claim 1, further comprising determining a number of slots to be located between most closely adjacent slots where power balancing adjustments are implemented, so that said number of slots is at least two slots.

6. The method of claim 5, said step of determining a number of slots to be located between most closely adjacent slots where power balancing adjustments are implemented is carried out using at least a value of the adjustment period and a determined number of power balancing adjustments to be made in the adjustment period.

7. A method of implementing balancing power adjustments in transmit power from a base station to a mobile station in a cellular telecommunications network, said method comprising the steps of:

determining a transmit power level of the base station;

determining a reference power level; and implementing a plurality of power balancing adjustments to the transmit power of the base station using at least the transmit power level and the reference power level, so that the plurality of power balancing adjustments are spaced apart from one another with slots having no power balancing adjustments being provided therebetween.

8. The method of claim 7, further comprising determining the number of slots to be located between respective slots in which adjacent ones of the plurality of balancing power adjustments are implemented.

9. The method of claim 8, wherein said step of determining the number of slots uses at least an adjustment period value and a number of adjustments value.

10. A method of implementing power balancing adjustments to transmit power of a base station to a mobile station in a cellular telecommunications network, said method comprising:

adjusting the transmit power of the base station in first and second spaced apart slots;

determining a spacing between the first and second slots; and wherein determining a spacing between the first and second slots comprises using at least a number of balancing adjustments to be made during an adjustment period.

11. The method of claim 10, further comprising rounding the number of balancing adjustments upwardly to the nearest integer which can be expressed as $2^n$, wherein n is an integer.

12. A node of a cellular telecommunications network, the node comprising:

a transmitter for transmitting radio signals to at least one mobile station; and a controller for controlling transmit power of the radio signals, wherein said controller is configured to adjust the transmit power in first and second spaced apart slots and determine a spacing between the first and second slots, wherein the controller is configured to determine the spacing between the first and second slots using at least a number of power balancing adjustments to be made during an adjustment period.

13. The node of claim 12, wherein said node comprises a base station of the cellular telecommunications network.

14. A node of a cellular telecommunications network, the node comprising:

a transmitter for transmitting radio signals to at least one mobile station;

a controller for controlling transmit power of the radio signals, wherein said controller is configured to adjust the transmit power in first and second spaced apart slots and determine a spacing between the first and second slots;

wherein the controller is configured to:

determine a desired power balancing value based at least upon a transmit power level and a reference power level; and adjust the transmit power of the base station by spreading at least a portion of the power balancing value over a plurality of spaced apart transmit power balancing adjustments in an adjustment period so that at least first and second power balancing adjustments are applied to the transmit power of the base station in the first and second spaced apart slots in the adjustment period, respectively, with no power balancing adjustments being applied to the transmit power of the base station in slots between the first and second spaced apart slots.

\* \* \* \* \*